(12) United States Patent
Maclaughlin et al.

(10) Patent No.: US 9,879,155 B2
(45) Date of Patent: Jan. 30, 2018

(54) PROTECTIVE BARRIER COMPOSITION FOR PHOTOCATALYTIC COATINGS

(71) Applicant: Bluescope Steel Limited, Melbourne, Victoria (AU)

(72) Inventors: Shane A. Maclaughlin, New South Wales (AU); Binbin Xi, New South Wales (AU); Evan J. Evans, New South Wales (AU); Edward M. Boge, New South Wales (AU)

(73) Assignee: Bluescope Steel Limited, Melbourne, Victoria (AU)

( * ) Notice: Subject to any disclaimer, the term of this patent is extended or adjusted under 35 U.S.C. 154(b) by 0 days.

(21) Appl. No.: 14/381,756

(22) PCT Filed: Feb. 28, 2013

(86) PCT No.: PCT/AU2013/000183
§ 371 (c)(1),
(2) Date: Aug. 28, 2014

(87) PCT Pub. No.: WO2013/126958
PCT Pub. Date: Sep. 6, 2013

(65) Prior Publication Data
US 2015/0072136 A1 Mar. 12, 2015

(30) Foreign Application Priority Data

Feb. 28, 2012 (AU) ................................ 2012900763
Feb. 28, 2012 (AU) ................................ 2012900764

(51) Int. Cl.
| | | |
|---|---|---|
| *C09D 1/00* | (2006.01) | |
| *C09D 183/04* | (2006.01) | |
| *B01J 33/00* | (2006.01) | |
| *B01J 35/00* | (2006.01) | |
| *B01J 37/00* | (2006.01) | |
| *B01J 31/38* | (2006.01) | |
| *B05D 5/00* | (2006.01) | |
| *B08B 17/06* | (2006.01) | |
| *B05D 3/12* | (2006.01) | |
| *B05D 7/00* | (2006.01) | |

(52) U.S. Cl.
CPC ............ *C09D 183/04* (2013.01); *B01J 31/38* (2013.01); *B01J 33/00* (2013.01); *B01J 35/004* (2013.01); *B01J 35/006* (2013.01); *B01J 35/0013* (2013.01); *B01J 37/0018* (2013.01); *B05D 3/12* (2013.01); *B05D 5/00* (2013.01); *B08B 17/065* (2013.01); *C09D 1/00* (2013.01); *B01J 2231/70* (2013.01); *B05D 7/52* (2013.01); *B05D 7/56* (2013.01); *Y10T 428/25* (2015.01); *Y10T 428/259* (2015.01); *Y10T 428/265* (2015.01); *Y10T 428/31663* (2015.04)

(58) Field of Classification Search
CPC ............................ B01J 35/004; C09D 183/04
See application file for complete search history.

(56) References Cited

U.S. PATENT DOCUMENTS

| | | |
|---|---|---|
| 4,478,876 A | 10/1984 | Chung |
| 6,265,029 B1 | 7/2001 | Lewis |
| 6,921,578 B2 | 7/2005 | Tsujino et al. |
| 7,354,650 B2 | 4/2008 | Nakajima et al. |
| 7,736,735 B2 | 6/2010 | Kanamori et al. |
| 2003/0059549 A1 | 3/2003 | Morrow et al. |
| 2005/0186436 A1 | 8/2005 | Kohler et al. |
| 2005/0233135 A1* | 10/2005 | Iyer ...................... C03C 17/007 428/331 |
| 2007/0060693 A1 | 3/2007 | Ho |
| 2007/0151482 A1* | 7/2007 | Im .......................... B82Y 30/00 106/287.19 |

(Continued)

FOREIGN PATENT DOCUMENTS

| | | | |
|---|---|---|---|
| EP | 0987317 | 3/2000 | |
| EP | 0987317 A1 * | 3/2000 | ............... B05D 5/00 |

(Continued)

OTHER PUBLICATIONS

Product data sheet for Avery Dennison T-7000, "Avery Dennison® T-7000 & W-7000 MVP Series," published Mar. 2014, retrieved online from http://reflectives.averydennison.com/content/dam/averydennison/reflectives/na/UK/Product-Data-Sheets/T-7000%20-%20WW%20-%20ENG%20-%2003-2014.pdf on Oct. 27, 2015.*
Product data sheet for Nissan Chemical Organosilicasol, May 2008, retrieved from https://web.archive.org/web/20080513155257/http://www.nissanchem-usa.com/organosilicasol.php on Oct. 27, 2015.*
International Search Report for PCT/AU2013/000183 dated Apr. 5, 2013 (5 pages).

(Continued)

*Primary Examiner* — Melvin C. Mayes
*Assistant Examiner* — Stefanie J Cohen
(74) *Attorney, Agent, or Firm* — Michael Best & Friedrich LLP

(57) ABSTRACT

A coated substrate including: a substrate including a treated layer, a photocatalytic layer, and a protective layer between the photocatalytic layer and the treated layer, the protective layer comprising colloidal particles dispersed in a matrix, the colloidal particles including first and second types of particles that differ in their respective particle size distributions and which together provide a physical barrier by virtue of the first, smaller particles at least partially filling interstices between the second, larger particles and thereby impede photocatalyst derived degradation of the treated layer, the first type of colloid particles comprising hydrolyzed silica based material such as reactive silica condensate particles or polyhedral oligomeric silsesquioxanes, or mixtures thereof, the protective layer having an effect of less than 20 delta E units on the color and gloss of the substrate.

26 Claims, 2 Drawing Sheets

(56) References Cited

U.S. PATENT DOCUMENTS

| 2009/0004482 | A1 | 1/2009 | Sharma |
| 2010/0021648 | A1 | 1/2010 | Ota |
| 2011/0058142 | A1 | 3/2011 | Berit-Debat et al. |

FOREIGN PATENT DOCUMENTS

| EP | 1101803 | | 3/2000 |
| EP | 1785457 | | 5/2007 |
| JP | 2004204091 | | 7/2004 |
| JP | 2004-237639 | A | 8/2004 |
| JP | 2006-008902 | A | 1/2006 |
| JP | 2011-111558 | A | 6/2011 |
| JP | 2011-161400 | A | 8/2011 |

OTHER PUBLICATIONS

International Preliminary Report on Patentability for PCT/AU2013/000183 dated Feb. 24, 2014 (5 pages).
English Translation of Chinese Office Action for Application No. 201380021582.5 dated Jan. 13, 2016 (12 pages).
English Translation of Taiwan Patent Office Action for Application No. 102107279 dated Aug. 2, 2016 (4 pages).
English Translation of Chinese Patent Office Action for Application No. 201380021582.5 dated Jul. 29, 2016 (11 pages).
Product Guide L-G 1 Pain Additives (Feb. 2009), retrieved on Mar. 8, 2013 from http://pcimag.com/text.resources/ PCI/Home/Files/PDFs/Virtual_Supplier_Brochures/BYK_Additives.pdf (15 pages).

* cited by examiner

PROTECTIVE BARRIER COMPOSITION FOR PHOTOCATALYTIC COATINGS

BACKGROUND OF THE INVENTION

The present disclosure relates to protective coatings for substrates. In particular, the present disclosure relates to protective coatings for use in self-cleaning systems.

Coated surfaces, such as painted surfaces, often accumulate dirt and dust with time particularly when exposed to the environment. This is a particular issue for such architectural building products as painted steel sheet which is, for example, used in roof and wall cladding. As a result, these surfaces have to be periodically cleaned to maintain their appearance. The cleaning process is typically costly, time consuming and sometimes difficult, particularly when these surfaces are hard to access. A significant amount of this dirt and dust is comprised of organic material.

In this regard, there is a need to reduce organic material accumulation on the coated surface to avoid the need to manually clean the coated surfaces regularly.

One solution is to include a substance in the coating that can degrade the organic material. One method of degrading organic material is to incorporate a photocatalytic layer in a coating. Under the action of light, the photocatalytic layer produces reactive oxygen species, such as hydroxyl and superoxide ions, that react with and destroy organic material. However, these ions can also attack the underlying substrate if it includes an organic composition (such as a paint layer) and can therefore adversely affect the durability and longevity of the coating.

Accordingly, there is a need for a means to impede diffusion of these reactive oxygen species.

The above references to the background art do not constitute an admission that the art forms a part of the common general knowledge of a person of ordinary skill in the art. The above references are also not intended to limit the application of the apparatus and method as disclosed herein.

SUMMARY OF THE INVENTION

In a first aspect, there is provided a coated substrate including:
 a substrate including a treated layer,
 a photocatalytic layer, and
 a non-photocatalytic, protective layer between the photocatalytic layer and the treated layer, the protective layer comprising colloidal particles dispersed in a matrix, the colloidal particles including first and second types of particles that differ in their respective particle size distributions and which together provide a physical barrier by virtue of the first, smaller particles at least partially filling interstices between the second, larger particles and thereby impede photocatalyst derived degradation of the treated layer, the first type of colloidal particles comprising hydrolysed silica based material, the protective layer having an effect of less than 20 delta E units on the colour and gloss of the substrate.

Colloidal particles can provide an effective physical barrier to diffusion of reactive oxygen species by virtue of their typical relatively evenly distributed size and shape which enables their assembly into a more or less regular lattice arrangement. Accordingly, adjacent particles within the lattice arrangement can touch and bond to each other. However, the interstitial volume between the colloidal particles potentially provides the pathway for chemical diffusion of reactive oxygen species. The inclusion of at least two or more different types of colloidal particles that differ in their respective particle size distribution enables the formation of a more effective physical barrier by virtue of the smaller particles at least partially filling the interstices between the larger particles and reducing the volume available for diffusion.

The inventors have recognised that the provision of a separate protective layer between the substrate and the photocatalytic layer (as opposed to a combined protective/photocatalytic layer) provides greater protection to the substrate from reactive oxygen species. A combined protective/photocatalytic layer may not offer sufficient protection unless specifically designed for that function.

In a second aspect, there is provided a coating composition for forming a protective coating between a substrate included a treated layer and a photocatalytic layer, the composition comprising non-photocatalytic colloidal particles in a medium, the colloidal particles including first, smaller and second, larger types of particles that differ in their respective particle size distributions, the first type of colloid particles comprising hydrolysed silica based material, reactive silica condensate particles or polyhedral oligomeric silsesquioxanes, or mixtures thereof, wherein the protective coating has an effect of less than 20 delta E units on the colour and gloss of the substrate after application thereto.

In a third aspect, there is disclosed a coated substrate including
 a substrate including a treated layer,
 a photocatalytic layer, and
 a non-photocatalytic protective layer between the photocatalytic layer and the treated layer, the protective layer comprising colloidal particles dispersed in a matrix, the colloidal particles including first and second types of particles that differ in their respective particle size distributions and which together provide a physical barrier by virtue of the first, smaller particles at least partially filling interstices between the second, larger particles and thereby impede photocatalyst derived degradation of the treated layer, the first type of colloidal particles comprising hydrolysed silica based material, the protective layer having an effect of less than 20 delta E units on the colour and gloss of the substrate wherein the matrix is comprised at least partly of:
 an organosilicon phase which is oxidisable by reactive oxygen species to form an inorganic silicate; and/or
 an inorganic silicate formed by the oxidation of the organosilicon phase.

The inclusion of an organosilicon phase, or its oxidation product, in the protective layer further enhances the density of the matrix which further inhibits diffusion of the reactive oxygen species. Through its oxidation to inorganic silica the matrix can therefore enhance the physical barrier afforded by the two or more different particle size distributions of the colloidal particles, and thereby enhance the function of the protective layer.

In a fourth aspect, there is disclosed a photocatalytic, self-cleaning coated substrate comprising:
 a substrate including a treated surface;
 a non-photocatalytic barrier layer on the treated layer, the barrier layer comprising non-photocatalytic colloidal particles dispersed in a matrix, the colloidal particles including first and second types of particles that differ in their respective particle size distributions and which together provide a physical barrier by virtue of the first, smaller particles at least partially filling interstices between the second, larger particles and thereby impede photocatalyst derived degradation of the treated layer, the first type of colloidal particles comprising hydrolysed silica based material selected from reactive silica condensate particles, polyhedral oligomeric silsesquioxanes, or mixtures thereof, the barrier layer having an effect of less than 20 delta E units on the colour and gloss of the substrate; and a photocatalytic layer on the barrier layer.

In a fifth aspect, there is disclosed a method for protecting a substrate from degradation by reactive oxygen species, the method including the steps of:

providing a substrate including a treated layer;

applying on the treated layer a coating of a composition comprising colloidal particles of one or more oxides dispersed in a medium, the colloidal particles including first, smaller and second, larger types of particles that differ in their respective particle size distributions, the first type of colloid particles comprising hydrolysed silica based material the protective layer having an effect of less than 20 delta E units on the colour and gloss of the substrate; and converting the coating to form a non-photocatalytic protective layer.

In a sixth aspect, there is disclosed a photocatalytic self-cleaning coated building product comprising:

a metal substrate;

a paint layer on the metal substrate;

a non-photocatalytic barrier layer on the paint layer, the barrier layer comprising colloidal particles dispersed in a matrix, the colloidal particles including at least first, smaller and second, larger types of particles that differ in their respective particle size distributions, the first type of colloid particles comprising hydrolysed silica based material, the protective layer having an effect of less than 20 delta E units on the colour and gloss of the substrate; and a photocatalytic layer on the barrier layer.

The first type of colloidal particles may have an average particle size between 0.4 and 50 nm, such as between 0.4 and 20 nm, for example between 0.4 to 5 nm.

The second type of colloidal particles may have an average particle size between 5 to 400 nm, such as between 5 and 200 nm, for example between 5 and 50 nm.

In an embodiment, the second colloidal particles have a particle size distribution between 5 and 40 nm, such as between 7 and 40 nm. The second colloidal particles may have a particle size greater than 8 nm, preferably greater than 10 nm, such as between 12 and 20 nm. Colloids having such particle size ranges are more commercially available than smaller particles sizes, which thereby facilitates processing. Also, where the colloidal particles are smaller than this size, the resulting smaller interstitial spaces provide less room to accommodate the first colloidal particles.

In another embodiment, the first particle size distribution is between 0.4 to 4 nm, preferably between 0.4 to 2 nm, more preferably from 0.4 to 1 nm.

The colloidal particles may be suspended or dispersed in an aqueous solution or an organic phase.

In an embodiment, the colloidal particles may include a third type of colloidal particles with a particle size distribution that differs from each of the first and second particle size ranges. The third type of colloidal particles may have a particle size distribution intermediate between that of the first and second particles. For example, the third type of colloidal particle may have a particle size range between 1 and 50 nm, such as between 1 and 20 nm. In this embodiment, the first type of particle may have a particle size in the range 0.4 to 2 nm and the second type of particle may have a particle size in the range 20 to 200 nm.

In an embodiment, the colloidal particles have a narrow particle size distribution. Preferably, at least the second type of colloid particles has a narrow particle size distribution.

The narrow particle size distribution may comprise a standard deviation of less than 20% of the average particle diameter. Preferably the standard deviation is less than 10%, such as less than 5% of the average particle diameter. In an embodiment, the standard deviation is 2% or less of the average particle diameter.

In an embodiment, the ratio of average particle radii in the first type to the second type of colloidal particles is less than 0.5 and preferably less than 0.15.

In an embodiment, at least one of the first and second colloidal particles comprises one or more oxides. The material of each type of colloidal particle may comprise one or more oxides of metallic and/or non-metallic elements such as Si, Al, B, Ti, Zr, and P.

The first type of colloid particles comprise hydrolysed silica based material, such as reactive silica condensate particles or polyhedral oligomeric silsesquioxanes.

In an embodiment, the first type of colloid particles comprises reactive silica condensate particles. The particles may comprise individual reactive silica condensate molecules. The reactive silica condensate particles may be present in an amount of between 0.1° A and 200% of the mass of the second type of colloid particles.

In an embodiment, the reactive silica condensate particles are alkoxysilane condensates having the general formula $Si_aO_b(OR')_c(R'')_d$ where R' and R'' are alkyl or functionalised alkyl groups and the values of a,b,c and d depend on the degree of hydrolysis and the identity of the silane starting materials. The alkoxysilane condensates are prepared by the hydrolysis and condensation of tetra-alkoxysilanes $Si(OR)_4$ or alkyl-substituted silanes $Si(R^1)_x(OR^2)_{4-x}$ or combinations of these, where:

$R=CH_3$, $C_2H_5$, $C_3H_7$ or $C_4H_9$, x=1-3

$R^1$ is an organic functional group, $R^2$ is an alkyl group $C_nH_{2n+1}$ where n=1-5.

$R^1$ may be an alkyl or aryl group, a halogen, an epoxide, an isocyanate, a hydroxide, a quaternary ammonium cation, an amine, a carboxylic acid or carboxylic acid derivative, a ketone or aldehyde, a hydroxide, or an ether.

Without wishing to be bound by theory, it is believed that the hydrolysis condensates may comprise a complex mixture of oligomers.

The alkyl substituted silane may comprise one or more of trimethylmethoxysilane, trimethylethoxysilane, phenyltrimethoxysilane, diphenyldimethoxysilane, n-propyltrimethoxysilane, isobutyltrimethoxysilane, n-decyltrimethoxysilane, n-hexyltrimethoxysilane, 1,6-bis(trimethoxysilyl)hexane, γ-ureidopropyltrimethoxysilane, γ-dibutylaminopropyltrimethoxysilane, nonafluorobutyltrimethoxysilane, γ-glycidoxypropyltrimethoxysilane, γ-glycidoxypropylmethyldimethoxysilane, γ-(2-aminoethyl)aminopropyltrimethoxysilane, γ-(2-aminoethyl)aminopropylmethyl-dimethoxysilane, γ-methacryloyloxypropyltrimethoxysilane, γ-mercaptopropyltrimethoxy-silane, γ-chloropropyltrimethoxysilane, γ-anilinopropyltrimethoxysilane, methyltrimethoxysilane, methyltriethoxysilane, vinyltrimethoxysilane, dimethyldimethoxysilane, octadecyldimethyl-[3-(trimethoxysilyl)propyl]ammonium chloride, N-trimethoxysilylpropyl-N,N,N-trimethylammonium chloride, N-(trimethoxysilylpropyl)-isothiouronium chloride, Aminophenyltrimethoxysilane, N-(trimethoxysilylethyl)benzyl-N,N,N-trimethylammonium chloride, N.N-didecy-N-methyl-N-(3-trimethoxysilylpropyl) ammonium chloride, (2-triethoxysilylpropoxy) ethoxysulfolane, N-(trimethoxysilylpropyl)ethylene-diaminetrisodium triacetate, 2-[methoxy (polyethyleneoxy)propyl]triemethoxysilane, Bis(3-trimethoxysilylpropyl)amine, Tetradecyldimethyl(3-trimethoxysilylpropyl)ammonium chloride, and N-(3-triethoxysilylpropyl)gluconamide.

The reactive hydrolysed silica condensate particles may be prepared from a tetramethoxy- or tetraethoxysilane.

The reactive hydrolysed silica condensate particles may have a percent hydrolysis between 30% to 70%.

The tetraalkoxysilane may undergo further condensation with aluminium tris(acetylacetonate). Again, without wishing to be bound by theory, it is believed that the condensates produced from the further condensation step may comprise relatively larger branched oligomers.

The reactive hydrolysed silica condensate particles may have a number average molecular weight between 1000 to 4000 grams per mole, such as between 1000 to 3000 grams per mole. Preferably the reactive hydrolysed silica condensate particles have a number average molecular weight from 1400-2000.

The reactive hydrolysed silica condensate particles may be treated with a modifying agent such as an alcohol, or a silane, to modify the properties of the reactive hydrolysed silica condensate particles. The modified properties may comprise improvement in the stability of the mixture (such as improved miscibility), or control of the reactivity of the condensate or both. The treatment of the reactive hydrolysed silica condensate particles may be conducted using acid catalysis.

Where the modifying agent is an alcohol, it may have the formula HOR where R is an alkyl ($C_nH_{2n+1}$, n=3-20) or fluoroalkyl ($C_nH_{2n+1-x}F_x$, n=3-20, x=1-41), or an alkyl group as described above but incorporating one or more specific functional groups including, but not limited to, vinyl or other olefinic, carboxylic acid or carboxylic acid derivative, ether, amine or amine derivative, thiol or thiol derivative, alkyl silane or alkylsilane derivative, carbonyl or carbonyl derivative, or any combination of the above.

Where the modifying agent is a silane, it may have the formula $Si(R^1)_x(OR^2)_{4-x}$ where:

x=1-3

$R^1$ is an organic functional group of the type commonly found in alkoxy silanes including an alkyl or aryl group, a halogen, an epoxide, an isocyanate, a hydroxide, a quaternary ammonium cation, an amine, a carboxylic acid or carboxylic acid derivative, a ketone or aldehyde, a hydroxide, an ether, etc.

$R^2$ is an alkyl group $C_nH_{2n+1}$ where n=1-5.

Where the modifying agent is a silane, it may comprise one or more of trimethylmethoxysilane, trimethylethoxysilane, phenyltrimethoxysilane, diphenyldimethoxysilane, n-propyltrimethoxysilane, isobutyltrimethoxysilane, n-decyltrimethoxysilane, n-hexyltrimethoxysilane, 1,6-bis(trimethoxysilyl)hexane, γ-ureidopropyltrimethoxysilane, γ-dibutylaminopropyltrimethoxysilane, nonafluorobutyltrimethoxysilane, γ-glycidoxypropyltrimethoxysilane, γ-glycidoxypropylmethyldimethoxysilane, γ-(2-aminoethyl)aminopropyltrimethoxysilane, γ-(2-aminoethyl)aminopropylmethyldimethoxysilane, γ-methacryloyloxypropyltrimethoxysilane, γ-mercaptopropyltrimethoxysilane, γ-chloropropyltrimethoxysilane, γ-anilinopropyltrimethoxysilane, methyltrimethoxysilane, methyltriethoxysilane, vinyltrimethoxysilane, dimethyldimethoxysilane, octadecyldimethyl-[3-(trimethoxysilyl)propyl]ammonium chloride, N-trimethoxysilylpropyl-N,N,N-trimethylammonium chloride, N-(trimethoxysilylpropyl)isothiouronium chloride, Aminophenyltrimethoxysilane, N-(trimethoxysilylethyl)benzyl-N, N,N-trimethylammonium chloride, N.N-didecy-N-methyl-N-(3-trimethoxysilylpropyl) ammonium chloride, (2-triethoxysilylpropoxy) ethoxysulfolane, N-(trimethoxysilylpropyl)ethylenediaminetrisodium triacetate, 2-[methoxy(polyethyleneoxy)propyl] triemethoxysilane, Bis(3-trimethoxysilylpropyl)amine, Tetradecyldimethyl(3-trimethoxysilylpropyl)ammonium chloride, and N-(3-triethoxysilylpropyl)gluconamide.

In another embodiment, the first type of colloidal particles are polyhedral oligomeric silsesquioxanes. The particles may comprise individual polyhedral oligomeric silsesquioxane molecules.

In another embodiment, the second type of colloidal particles comprise the LUDOX® family of nanoparticulate silica colloids.

The first and second colloidal particles are dispersed in a matrix. The matrix may be comprised at least partly of an oxidisable phase which is oxidisable by the reactive oxygen species to form a non-volatile inorganic phase having a density sufficient to impede diffusion of the reactive oxygen species. The oxidisable phase may be as described in applicant's co-pending patent application No 2012900763 titled "Coating I", the entire disclosure of which is incorporated herein by reference.

In an embodiment, the oxidisable phase comprises at least one organosilicon phase which is oxidisable by the reactive oxygen species to form an inorganic silicate phase. The organosilicon phase may be a free silane, a sol-gel, an organic-inorganic polymer hybrid or a silicone microemulsion, an organosilicon compound coated onto individual silica colloid particles, or combinations thereof. The inorganic silicate phase may be a network silicate.

In an embodiment, the at least one organosilicon phase includes or consists of a surfactant incorporating an organosilicon component, such as one of the family of ethoxylated heptamethyltrisiloxane surfactants or polyalkyleneoxide modified heptamethyltrisiloxanes such as 2-[methoxy(polyethyleneoxy)propyl]heptamethyltri-siloxane). It has been found that optimum results are obtained where the organosilicon phase comprises a surfactant incorporating an organosilicon component, either by itself or in combination with a free silane, an organic-inorganic polymer hybrid or a silicone microemulsion. In an embodiment, the organosilicon phase comprises a surfactant by itself. Without wishing to be limited by theory, it is believed that the use of a surfactant as the organosilicon phase (as opposed to eg a resin) ensures sufficient wetting of the colloidal particles (particularly the second particles) and therefore optimal bonding together of the particles in the protective layer. It has been found that the inclusion of a surfactant in the coating composition also facilitates application of the coating composition, such as by roll coating. The use of a silicon based surfactant as opposed to a carbon based one also enhances the bond strength between the colloidal particles and the organosilicon matrix.

In another embodiment, the organosilicon phase comprises a functionalized alkylsubstituted alkoxysilane $Si(R^1)_x(OR^2)_{4-x}$ where:

x=1-3

$R^1$ is an organic functional group of the type commonly found in alkoxy silanes including an alkyl or aryl group, a halogen, an epoxide, an isocyanate, a hydroxide, a quaternary ammonium cation, an amine, a carboxylic acid or carboxylic acid derivative, a ketone or aldehyde, a hydroxide, an ether, etc.

$R^2$ is an alkyl group $C_nH_{2n+1}$ where n=1-5.

The alkylsubstituted alkoxysilane may be one or more of trimethylmethoxysilane, trimethylethoxysilane, phenyltrimethoxysilane, diphenyldimethoxysilane, n-propyltrimethoxysilane, isobutyltrimethoxysilane, n-decyltrimethoxysilane, n-hexyltrimethoxysilane, 1,6-bis (trimethoxysilyl)hexane, γ-ureidopropyltrimethoxysilane, γ-dibutylam inopropyltrimethoxysilane, nonafluorobutyltrimethoxysilane, γ-glycidoxypropyltrimethoxysilane, γ-glycidoxypropylmethyldimethoxysilane, γ-(2-aminoethyl) aminopropyltrimethoxysilane, γ-(2-aminoethyl) aminopropylmethyldimethoxy-silane, γ-methacryloyloxypropyltrimethoxysilane, γ-mercaptopropyltrimethoxysilane, γ-chloropropyltrimethoxysilane, γ-anilinopropyltrimethoxysilane, methyltrimethoxysilane, methyltriethoxysilane, vinyltrimethoxysilane, dimethyldimethoxysilane, octadecyldimethyl-[3-(trimethoxysilyl)propyl]ammonium chloride, N-trimethoxysilylpropyl-N,N,N-trimethylammonium chloride N-(trimethoxysilylpropyl)isothiouronium chloride, Aminophenyltrimethoxysilane,N-(trimethoxysilylethyl) benzyl-N, N,N-trimethylammonium chloride, N.N-didecy-N-methyl-N-(3-trimethoxysilylpropyl)ammonium chloride, (2-triethoxysilylpropoxy)ethoxysulfolane, N-(trimethoxysilylpropyl)ethylenediaminetrisodium triacetate, 2-[methoxy (polyethyleneoxy)propyl]triemethoxysilane, Bis(3-trimethoxysilylpropyl)amine, Tetradecyldimethyl(3-trimethoxysilylpropyl)ammonium chloride, and N-(3-triethoxysilylpropyl)gluconamide.

In an embodiment, before or during incorporation of the colloidal particles into the coating composition, the colloidal particles may be stabilised in alkaline solution. Stabilisation may be necessary to prevent or minimize coagulation of the colloidal particles. In an embodiment, the colloidal particles are associated with soluble cations including, but not limited to, lithium, sodium, potassium, ammonium, and alkyl ammonium ions.

In another embodiment, the colloidal particles may be stabilised in an organic solvent.

The choice of aqueous or organic medium will be largely dependent on the surface characteristics of the colloidal particles. In general, uncoated colloidal particles are suspended in an aqueous medium, whereas colloidal particles coated with an organosilicon phase are suspended in an organic medium.

The concentration of colloidal particles in the coating solution may range from 0.1-30 wt %. The concentration is preferably less than 20 wt %, such as from 1 to 2 wt %. In an embodiment, the concentration ranges from 0.1 to 10 wt %.

In an embodiment, the effect of the protective layer on the colour and gloss of the substrate is not more than 20 delta E units such as less than 10 delta E units, for example less than 5 delta E units. Preferably, the gloss difference between the coated substrate and an uncoated substrate is not more than 20%, more preferably not more than 10%, more preferably not more than 5%.

In an embodiment, the thickness of the protective layer is from 25 to 1000 nm. Preferably, the thickness of the protective layer is from 50 to 600 nm. More preferably, the thickness is from 60 to 400 nm. The optimum thickness will depend on the composition of the layer and the roughness of the underlying substrate. However, it has been found that where the coating thickness exceeds approximately 1000 nm, the mechanical stability of the coating begins to decline and the coating is prone to cracking.

The protective coating composition may be applied by roll coating. The roll coating is preferably conducted in a continuous process. After the coating composition is applied, it is dried at a temperature sufficient to remove excess solvent, such as in the range 50 to 150° C.

It has been found that the inclusion of a surfactant in the coating composition facilitates application of the coating composition by roll coating. The surfactant enhances wettability of the surface being coated and avoids the need for specialised surface treatment prior to application, such as by corona discharge treatment. Roll coating also enables the coating composition to be applied in a relatively thin layer as compared to other application techniques, such as spraying.

The coated substrate may also include a photocatalyst capable of generating reactive oxygen species. The photocatalyst may be present in a separate, photocatalytic layer.

The photocatalyst interacts with electromagnetic radiation and water to produce reactive oxygen species, such as hydroxyl and superoxide ions, that act as an oxidant to degrade organic material and prevent their accumulation on the coating surface.

The substrate may be a metal substrate. In an embodiment, the substrate includes a treated surface. The treated surface may be a coloured surface, such as a painted surface. Alternatively, the treated surface may include a polymeric coating, such as on a solar cell.

The protective layer may be a barrier layer provided between the treated surface and a photocatalytic layer.

In an embodiment, a photocatalyst is provided in a separate photocatalytic layer, wherein the protective layer is located between the substrate and the photocatalytic layer. The photocatalyst layer may also include other colloidal particles, such as colloidal silica particles.

The photocatalyst may be dispersed in a solvent in a concentration range from 0.01 to 30 wt % before application onto the protective layer. In an embodiment, the concentration ranges from 0.1 to 10 wt %. Preferably, the concentration range is from 1 to 3 wt %. The solvent may be aqueous or organic-based.

The photocatalytic particles may be comprised of a metal oxide such as, but not limited to, one of nanoparticulate titanium dioxide or derivatives of titanium dioxide such as titanium dioxide doped with metal cations such as iron, vanadium, and other transition or rare earth metals, nanoparticulate zinc oxide, nanoparticulate tin oxide, or nanoparticulate cerium oxide. The nanoparticulate titanium dioxide may be the commercially available Degussa P25 photocatalyst.

The photocatalytic particles may have an average size of the same order of magnitude as the second type of colloidal particles. Where the photocatalyst particles comprise Degussa P25 photocatalyst, they typically have an average particle size of about 21 nm.

Advantageously, when photocatalytic particles in the form of titanium dioxide are used with silica colloidal particles, hydrophilicity of the coating surface is enhanced to improve the self-cleaning properties of the coating.

In an embodiment, the matrix comprises from 0.1° A to 100% by weight of the colloid particles.

BRIEF DESCRIPTION OF DRAWINGS

Preferred embodiments are hereinafter described by way of example only, with reference to the accompanying drawings, wherein.

DETAILED DESCRIPTION

Figure 1:
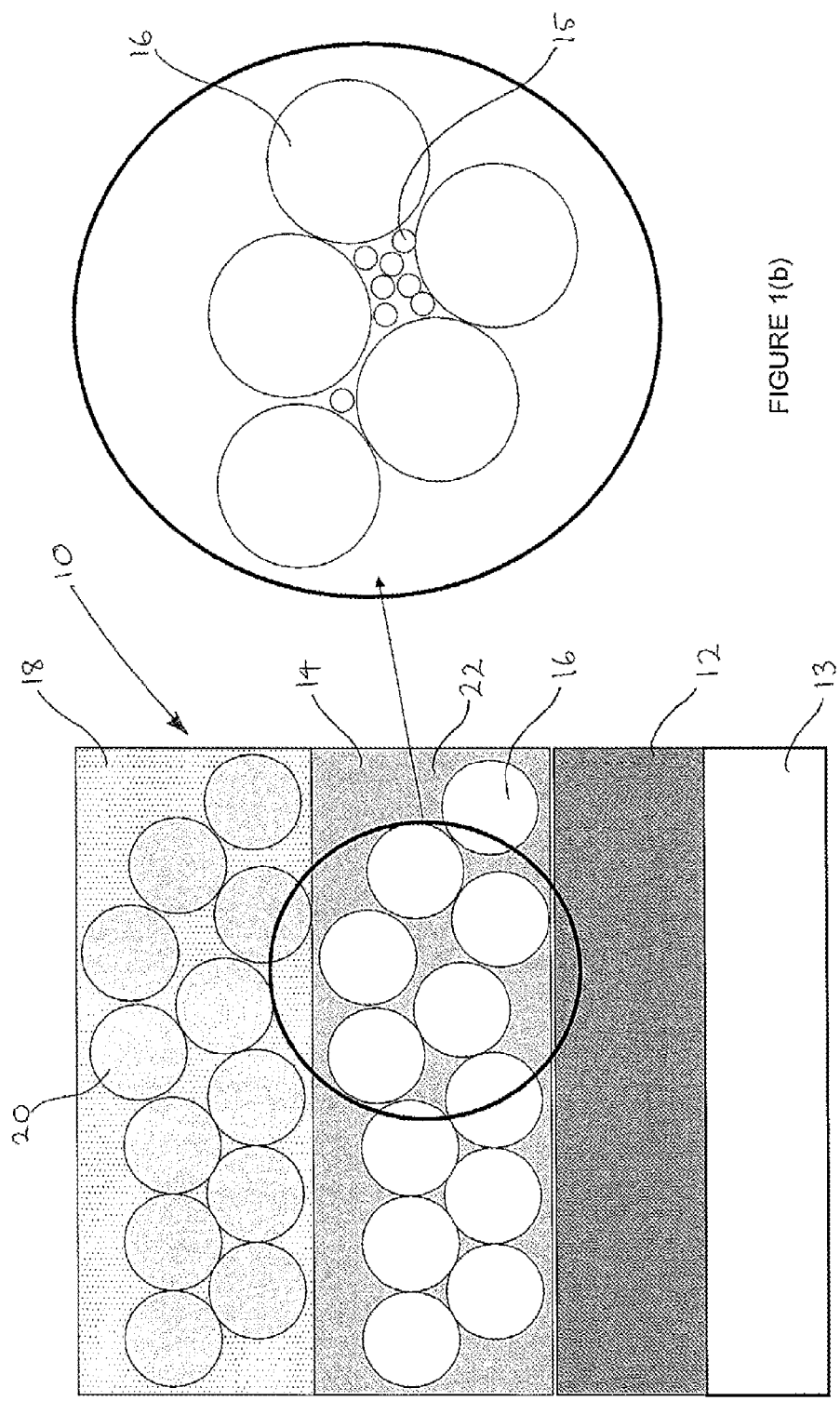
FIG. 1(a) is a cross-sectional schematic view of an embodiment of a coated substrate with separate protective and photocatalytic layers.
FIG. 1(b) is a schematic magnified view of first and second types of colloidal particles in the protective layer of the embodiment of the coated substrate.

One form of a coated substrate generally denoted as 10 is illustrated in FIGS. 1(a) and (b).

The coated substrate 10 includes paint layer 12 disposed on metal substrate 13, a protective layer 14 on the paint layer 12 and a photocatalytic layer 18 on the protective layer. The protective layer 14 comprises colloidal particles, 15, 16 distributed in a matrix 22. The colloidal particles include first and second types of particles, 15, 16, respectively, that differ in their respective particle size distributions. The first type of colloidal particles, 15, has an average particle size between 0.4 and 4 nm. The second type of colloidal particles, 16, has an average particle size between 12 to 14 nm.

The matrix 22 may be comprised of an oxidisable phase which is oxidisable by reactive oxygen species to form a non-volatile inorganic phase.

The photocatalytic layer 18 includes photocatalytic particles 20 comprising of a metal oxide such as, but not limited to, one of nanoparticulate titanium dioxide or derivatives of titanium dioxide such as titanium dioxide doped with metal cations such as iron, vanadium, and other transition or rare earth metals, nanoparticulate zinc oxide, nanoparticulate tin oxide, or nanoparticulate cerium oxide.

In the embodiment of FIGS. 1(a) and (b) the first type of colloidal particles, 15, comprise reactive silica condensate particles. However, they may instead or additionally comprise polyhedral oligomeric silsesquioxanes. The first type of colloidal particles, 15, have a number average molecular weight between 1000 to 3000 grams per mole, preferably from 1400-2000.

The first type of colloid particles, 15, are preferably alkoxysilane condensates prepared by the hydrolysis and condensation of tetra-alkoxysilanes $Si(OR)_4$ or alkyl-substituted silanes $Si(R^1)_x(OR^2)_{4-x}$ where:

R=$CH_3$, $C_2H5$, $C_3H_7$ or $C_4H_9$, x=1-3

$R^1$ is an organic functional group, $R^2$ is an alkyl group $C_nH_{2n+1}$ where n=1-5.

Figure 2:
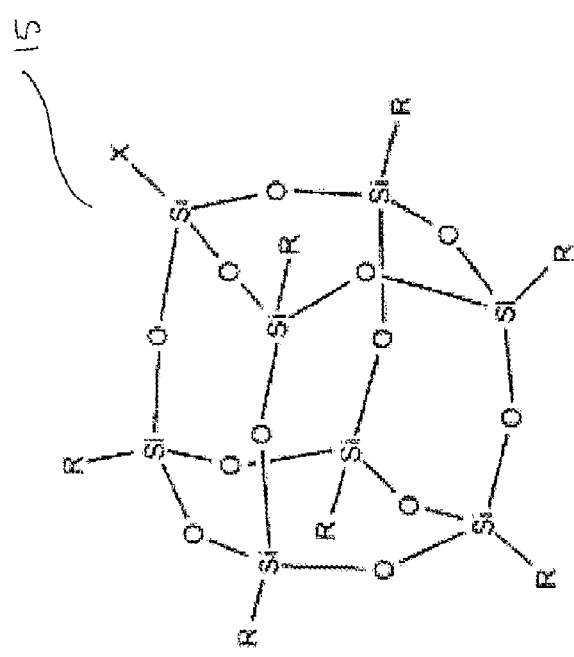
FIG. 2 is a schematic view of the structure of polyhedral oligomeric silsesquioxane.

FIG. 2 illustrates the chemical structure of another form of the first colloidal particles $15^1$, namely a polyhedral oligomeric silsesquioxane cage. The groups R and X can be varied to enhance the functionality of the molecule. The estimated effective diameter of the cage is 0.35 nm.

The second type of colloidal particles, 16 comprise LUDOX® nanoparticulate silica colloidal particles having an average particle size between 7 and 40 nm, preferably 12 to 20 nm.

The protective layer 14 is formed by the application of a coating composition containing the first and second types of colloidal particles 15, 16.

The second colloidal particles 16 are preferably stabilised as a suspension in an aqueous or organic medium before incorporation into the coating composition, with the concentration of colloidal particles in the coating composition ranging from 0.1 to 10 wt %.

The second type of colloid particles 16 has a narrow particle size distribution. The particle size distribution has a standard deviation of less than 2% of the average particle size. The ratio of average particle radii in the first type of colloidal particles, 15, to the second type of colloidal particles, 16, is less than 0.15.

Photocatalytic particles 20 are dispersed in the solvent at a concentration range from 0.1 to 10 wt % before application onto protective layer 14. The solvent can be aqueous or organic-based and includes alkali solutions, alcohols of the general formula $HOC_nH_{2n+1}$, where n=1 to 8, aromatic hydrocarbons, aliphatic hydrocarbons, ketones, ethers or halogen compounds such as chloroform and methylene chloride.

Upon application of the colloidal suspension onto paint layer 12, the larger, second type of colloidal particles, 16, adopt a lattice-like formation in which adjacent particles are able to contact and bond to each other within matrix 22. The smaller, first type of colloidal particles, 15, at least partially fill the interstitial volume between the particles 16, (see FIG. 1(b)). This configuration assists to provide a physical barrier to diffusion of reactive oxygen species by impeding the diffusion paths of reactive oxygen species through the protective layer 14.

When the photocatalytic particles 20 are activated by electromagnetic radiation such as ultraviolet and visible radiation, they produce reactive oxygen species such as hydroxyl and superoxide ions. Any organic material deposited onto the coating is oxidised by the reactive oxygen species to produce carbon dioxide and water and thereby assist to keep the coated substrate clean.

Figure 3:
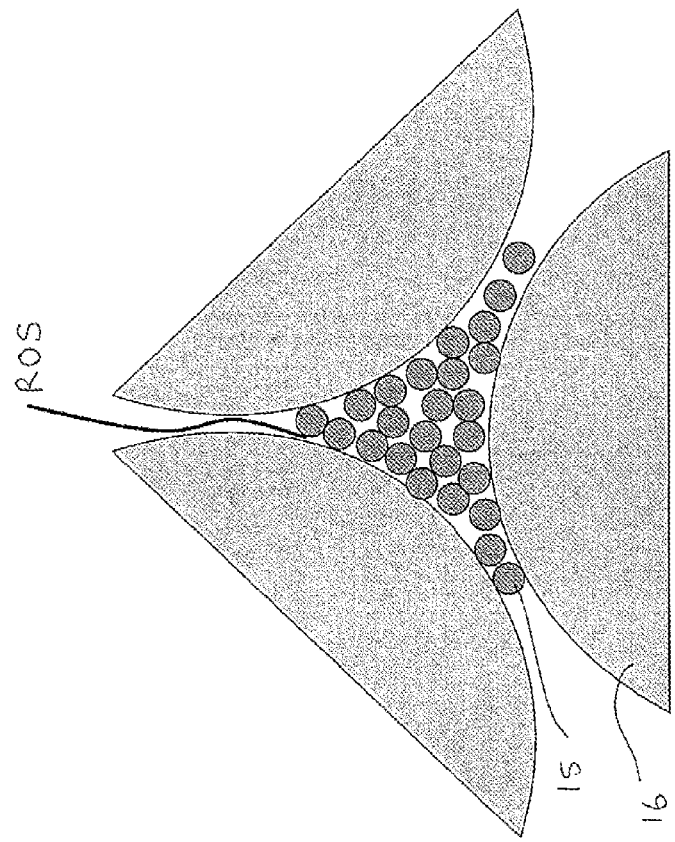
FIG. 3 is a schematic cross sectional view of a diffusion path of a reactive oxygen species in the protective layer of embodiment of the coated substrate.

FIG. 3 illustrates schematically that when these reactive oxygen species diffuse into the protective layer 14, the second type of colloidal particles 16 present a primary barrier to their diffusion into the underlying paint layer 12. The smaller, first type of colloidal particles, 15, impedes the diffusion of reactive oxygen species (ROS) through the protective layer via the interstices between the larger colloidal particles 16.

EXAMPLE

A panel, which had been coil coated with a melamine cured polyester paint, was treated with a protective coating composition formulated as follows.

Preparation of crude alkoxysilane condensate: A crude alkoxysilane condensate was prepared by combining tetramethyl orthosilicate (TMOS, 20 gm), methanol (6.32 gm) and 0.05% HCl (2.13 gm) in a 500 mL three-necked round bottom flask and refluxed at 65° C. for 2 hrs under nitrogen atmosphere. Volatiles were distilled from the system to a maximum distillate temperature of 130° C., after which the system was maintained at 150° C. for three hrs.

Preparation of modified alkoxysilane condensate: A solvent mixture was prepared containing water (6.52 gm), 2-methoxyethanol (62.4 gm) and aluminium tris(acetylacetonate) (0.31 gm). The crude alkoxysilane condensate product (1 gm) was dissolved in 2.25 gm of the solvent mixture. After 60 minutes a 0.3 gm of (2-[methoxy(polyethyleneoxy)propyl]-trimethoxysilane was added and the mixture was allowed to stand at room temperature overnight.

Preparation of silica colloid barrier layer: A barrier coating mixture was prepared by combining the modified alkoxysilane condensate solution from above with 60 gm of a LUDOX® HS-40 silica colloid suspension diluted with water to 2% w/w silica. The final mixture contained 1.9% w/w silica colloid having an average particle size of 17 nm and 0.8% w/w of modified alkoxysilane condensate having an average particle size of 1 nm. 0.4% v/v of the surfactant 2-[methoxy(polyethyleneoxy)-propyl]heptamethyltrisiloxane was added.

The coating mixture was applied to a painted panel using a number 10 drawdown bar. After drying, the calculated average barrier layer thickness was 270 nm. The coated panel was then further treated with a 2% w/w solution of P25 titanium dioxide photocatalyst in water using a number 10 drawdown bar. After drying, the calculated average barrier layer thickness was 270 nm. This provided a high concentration of active photocatalyst on the surface of the panel. The specifications of the coated panel are shown below in Table 1 as Sample 5.

A melamine cured polyester paint was used because the effects of photocatalytically driven oxidation would be more readily apparent on this system than on polyvinylidenefluoride paint Comparison Samples 1 to 4 were prepared in a similar way according to the specifications given in Table 1 below.

Each Sample was exposed to UV radiation for discrete periods of time up to 2000 hours. After each exposure period a test piece was removed from the panel, washed to remove the protective and photocatalytic layers, and the surface gloss of the underlying paint was measured using a BYK GARDNER® Trigloss glossmeter. The results are presented in Table 2.

TABLE 1

Coating Compositions

| Sample | Paint system | Barrier Treatment | Surfactant | Photocatalyst Treatment |
|---|---|---|---|---|
| 1 | MF Polyester | None | None | None |
| 2 | MF Polyester | None | None | 2% P25 in water |
| 3 | MF Polyester | LUDOX® HS 30 | None | 2% P25 in water |
| 4 | MF Polyester | LUDOX® HS 30 + ASC | TRITON® X100 | 2% P25 in water |
| 5 | MF Polyester | LUDOX® HS 30 + ASC | 2-[methoxy(polyethyleneoxy)propyl]heptamethyltrisiloxane | 2% P25 in water |

TABLE 2

Surface Gloss Measurement

| Sample No. | Exposure Time (light hrs QUVA) | | | | | | | |
|---|---|---|---|---|---|---|---|---|
| | 112 | 224 | 336 | 448 | 560 | 672 | 784 | 2000 |
| 1 | ○ | ○ | ○ | ○ | ○ | ○ | ○ | ● |
| 2 | ● | ● | ● | ● | ● | ● | ● | ● |
| 3 | ● | ● | ● | ● | ● | ● | ● | ● |
| 4 | ○ | ○ | ○ | ○ | ○ | ◙ | ◙ | ● |
| 5 | ○ | ○ | ○ | ○ | ○ | ○ | ◙ | ● |

○ - full retention of surface gloss
◙ - partial retention of surface gloss
● - complete loss of surface gloss Sample 1 did not include a photocatalytic layer nor a protective layer and therefore did not exhibit self cleaning behaviour. Samples 2 to 5 each included a photocatalytic coating formed from a 2% w/w solution of P25 titanium dioxide photocatalyst in water. Sample 2 did not include a protective (barrier) coating between the paint layer and photocatalyst layer. Sample 3 did include a protective layer which comprised second colloidal particles comprising LUDOX® HS 30 particles having a nominal particle size of 17 nm, but no first colloidal particles. Sample 3 also did not include a surfactant. Sample 4 included a protective layer including first and second colloidal particles (alkoxy silane condensate and LUDOX® HS 30 particles, respectively) and a surfactant comprising TRITON® X-100 ($C_{14}H_{22}O$ $(C_2H_4O)_n$). Sample 5 included a protective layer including the first and second colloidal particles and a surfactant incorporating an organosilicon component.

It is evident from a comparison of Sample 1 (no photocatalytic layer nor protective layer) with Sample 5 (including a photocatalytic layer and a protective layer comprising first and second colloidal particles distributed in a matrix of a surfactant incorporating an organosilicon component) that similar gloss levels are retained at least up to an exposure time of 784 hours. This indicates that the protective layer prevents degradation of the paint layer by radicals generated by the photocatalytic layer.

A comparison of the gloss level results for those samples that did include a photocatalytic layer (ie, Samples 2 to 5) shows that optimum results were achieved when a protective layer was included, and where that protective layer contained both first and second colloidal particles and a surfactant. It was found that improved results were obtained when the surfactant incorporated an organosilicon component In Sample 5, where the surfactant comprised 2-[methoxy(oligoethyleneoxy)propyl] heptamethyltrisiloxane, there was full retention of surface gloss until in excess of 672 hours exposure time, whereas Sample 4 exhibited only partial retention of surface gloss at 672 hours.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A photocatalytic, self-cleaning coated building product including:
   a metal substrate including a treated layer comprising a painted layer,
   a photocatalytic layer, and
   a non-photocatalytic protective layer between the photocatalytic layer and the treated layer, the protective layer consisting of: (a) discrete spherical colloidal particles, and (b) a matrix, wherein the discrete spherical colloidal particles are dispersed in the matrix, wherein the colloidal particles have a narrow particle size distribution comprising a standard deviation of less than 20% of the average particle diameter, the colloidal particles including first and second types of particles that differ in their respective particle size distributions, the second, larger particles in a lattice-like formation, the first and second types of particles together providing a physical barrier by virtue of the first, smaller particles at least partially filling interstices between the second, larger particles and thereby impeding photocatalyst derived degradation of the treated layer, the first type of colloid particles comprising hydrolysed silica based material comprising reactive silica condensate particles or polyhedral oligomeric silsesquioxanes, or mixtures thereof, wherein the gloss difference, measured at a 60° angle of incidence according to ASTM D523, between the coated building product and an uncoated substrate is not more than 20%.

2. The building product of claim 1, wherein the first type of colloidal particles have an average particle size between 0.4 and 50 nm.

3. The building product of claim 1, wherein said first type of colloidal particles have an average particle size between 0.4 and 20 nm.

4. The building product of claim 1, wherein the second type of colloidal particles have an average particle size between 5 to 200 nm.

5. The building product of claim 1, wherein the ratio of average particle radii in the first type of colloidal particles to the second type of colloidal particles is less than 0.5.

6. The building product of claim 1, wherein the material of the colloidal particles comprises one or more oxides of metallic and/or non-metallic elements selected from the group consisting of Si, Al, B, Ti, Zr, and P.

7. The building product of claim 1, wherein the first type of colloid particles comprises reactive silica condensate particles comprising alkoxysilane condensates prepared by the hydrolysis and condensation of tetra-alkoxysilanes $Si(OR)_4$ or alkyl-substituted silanes $Si(R^1)_x(OR^2)_{4-x}$ where:
R=$CH_3$, $C_2H_5$, $C_3H_7$ or $C_4H_9$,
x=1-3
$R^1$ is an organic functional group selected from the group consisting of an alkyl or aryl group, a halogen, an epoxide, an isocyanate, a hydroxide, a quaternary ammonium cation, an amine, a carboxylic acid or carboxylic acid derivative, a ketone or aldehyde, a hydroxide, and an ether, and
$R^2$ is an alkyl group $C_nH_{2n+1}$ where n=1-5.

8. The building product of claim 7, wherein the reactive silica condensate particles are present in an amount of between 0.1% and 200% of the mass of the second type of colloid particles.

9. The building product of claim 7, wherein the reactive hydrolysed silica condensate particles have a percent hydrolysis between 30% to 70%.

10. The building product of claim 7, wherein the reactive hydrolysed silica condensate particles have a number average molecular weight between 1000 to 4000 grams per mole.

11. The building product of claim 7, wherein the reactive hydrolysed silica condensate particles have a ratio of hydroxy to methoxy substituent at silicon of approximately 0.8.

12. The building product of claim 7, wherein the reactive hydrolysed silica condensate particles are treated with a modifying agent, to modify the properties of the reactive hydrolysed silica condensate particles by improving one or both of the stability of the mixture, or control of the reactivity of the condensate.

13. The building product of claim 1 wherein the second colloidal particles comprise nanoparticulate silica colloids.

14. The building product of claim 1, wherein the matrix is at least partly comprised of an oxidisable phase which is oxidisable by a reactive oxygen species to form a non-volatile inorganic phase having a density sufficient to impede diffusion of the reactive oxygen species.

15. The building product of claim 14, wherein the oxidisable phase comprises at least one organosilicon phase which is oxidisable by the reactive oxygen species to form an inorganic silicate phase.

16. The building product of claim 15 wherein the at least one organosilicon phase includes a surfactant incorporating an organosilicon component.

17. The building product of claim 1 wherein the thickness of the protective layer is from 25 to 1000 nm.

18. A coating composition for forming a non-photocatalytic protective coating between a metal substrate included a painted layer and a photocatalytic layer, the composition consisting of discrete spherical colloidal particles in a medium, wherein the colloidal particles have a narrow particle size distribution comprising a standard deviation of less than 20% of the average particle diameter, the colloidal particles including first, smaller and second, larger types of particles that differ in their respective particle size distributions, the second, larger particles forming a lattice-like formation after application of the coating composition, the first type of colloid particles comprising hydrolysed silica based material, reactive silica condensate particles or polyhedral oligomeric silsesquioxanes, or mixtures thereof, wherein the gloss difference, measured at a 60° angle of incidence according to ASTM D523, between the coated metal substrate and an uncoated substrate is not more than 20% after application thereto.

19. A method for protecting a painted metal substrate from degradation by reactive oxygen species, the method including the steps of:
providing a metal substrate including a painted layer;
applying on the painted layer a coating of a composition consisting of discrete spherical colloidal particles of one or more oxides dispersed in a medium, wherein the colloidal particles have a narrow particle size distribution comprising a standard deviation of less than 20% of the average particle diameter, the colloidal particles including first, smaller and second, larger types of particles that differ in their respective particle size distributions, the first type of colloid particles comprising hydrolysed silica based material comprising reactive silica condensate particles or polyhedral oligomeric silsesquioxanes, or mixtures thereof, the protective layer having an effect of less than 20 delta E units on the colour of the substrate; and
converting the coating to form a non-photocatalytic protective layer in which the second, larger particles are in a lattice-like formation, and the first, smaller particles at least partially fill interstices between the second, larger particles, the first and second types of particles together providing a physical barrier for impeding photocatalyst derived degradation of the painted layer, wherein the gloss difference, measured at a 60° angle of incidence according to ASTM D523, between the coated metal substrate and an uncoated substrate is not more than 20%.

20. The building product of claim 1, wherein said first type of colloidal particles have an average particle size between 0.4 to 5 nm.

21. The building product of claim 12, wherein the modifying agent is an alcohol or a silane.

22. A photocatalytic, self-cleaning coated building product including:
a metal substrate including a treated layer comprising a painted layer,
a photocatalytic layer, and
a non-photocatalytic protective layer between the photocatalytic layer and the treated layer, the protective layer comprising: (a) discrete spherical colloidal particles, and (b) a matrix, wherein the discrete spherical colloidal particles are dispersed in the matrix, wherein the colloidal particles have a narrow particle size distribution comprising a standard deviation of less than 20% of the average particle diameter, the colloidal particles including first and second types of particles that differ in their respective particle size distributions, the second, larger particles in a lattice-like formation, the first and second types of particles together providing a physical barrier by virtue of the first, smaller particles at least partially filling interstices between the second, larger particles and thereby impeding photocatalyst derived degradation of the treated layer, the first type of colloid particles comprising hydrolysed silica based material comprising reactive silica condensate particles or polyhedral oligomeric silsesquioxanes, or mixtures thereof, and wherein the protective layer does not include elongate particles.

23. The building product of claim 1, wherein the colloidal particles include a third type of colloidal particles with a particle size distribution that differs from each of the first and second particle size ranges.

24. A photocatalytic, self-cleaning coated building product including:
 a metal substrate including a treated layer comprising a painted layer,
 a photocatalytic layer, and
 a non-photocatalytic protective layer between the photocatalytic layer and the treated layer, the protective layer consisting of (a) discrete spherical colloidal particles and (b) a matrix, wherein the discrete spherical colloidal particles are dispersed in the matrix, wherein the colloidal particles have a narrow particle size distribution comprising a standard deviation of less than 20% of the average particle diameter, the colloidal particles including first and second types of particles that differ in their respective particle size distributions, the second, larger particles in a lattice-like formation, the first and second types of particles together providing a physical barrier by virtue of the first, smaller particles at least partially filling interstices between the second, larger particles and thereby impeding photocatalyst derived degradation of the treated layer, the first type of colloid particles comprising hydrolysed silica based material comprising reactive silica condensate particles or polyhedral oligomeric silsesquioxanes, or mixtures thereof.

25. A method for protecting a painted metal substrate from degradation by reactive oxygen species, the method including the steps of:
 providing a metal substrate including a painted layer;
 applying on the painted layer a coating of a composition consisting of discrete spherical colloidal particles of one or more oxides dispersed in a medium, wherein the colloidal particles have a narrow particle size distribution comprising a standard deviation of less than 20% of the average particle diameter, the colloidal particles including first, smaller and second, larger types of particles that differ in their respective particle size distributions, the first type of colloid particles comprising hydrolysed silica based material comprising reactive silica condensate particles or polyhedral oligomeric silsesquioxanes, or mixtures thereof; and
 converting the coating to form a non-photocatalytic protective layer in which the second, larger particles are in a lattice-like formation, and the first, smaller particles at least partially fill interstices between the second, larger particles, the first and second types of particles together providing a physical barrier for impeding photocatalyst derived degradation of the painted layer.

26. The building product of claim 1, wherein the matrix comprises from 0.1% to 100% by weight of the colloidal particles.

* * * * *